US012652268B2

(12) United States Patent
Appachi gounder et al.

(10) Patent No.: US 12,652,268 B2
(45) Date of Patent: Jun. 9, 2026

(54) POLICY AND TRAFFIC MANAGEMENT IN AN OVERLAY NETWORK

(71) Applicant: Google LLC, Mountain View, CA (US)

(72) Inventors: Arivudainambi Appachi gounder, San Jose, CA (US); Parthasarathi Palanisamy, San Jose, CA (US); Stephen Stuart, Los Altos Hills, CA (US); Arie Vayner, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 216 days.

(21) Appl. No.: 18/384,244

(22) Filed: Oct. 26, 2023

(65) Prior Publication Data

US 2025/0141840 A1     May 1, 2025

(51) Int. Cl.
*H04L 9/40* (2022.01)
(52) U.S. Cl.
CPC ...... *H04L 63/0236* (2013.01); *H04L 63/0254* (2013.01)
(58) Field of Classification Search
CPC . H04L 63/0236; H04L 63/0254; H04L 45/64; H04L 63/0218; H04L 41/0895; H04L 45/126; H04L 45/38; H04L 47/10; H04L 63/0263
See application file for complete search history.

(56) References Cited

U.S. PATENT DOCUMENTS

| | | | | |
|---|---|---|---|---|
| 12,513,114 B2* | 12/2025 | Mestery | ............. | H04L 63/0236 |
| 2004/0042458 A1* | 3/2004 | Elzu | ........................ | H04L 69/10 |
| | | | | 370/389 |
| 2013/0091560 A1* | 4/2013 | Killian | ............... | H04L 63/0272 |
| | | | | 726/12 |
| 2015/0039784 A1* | 2/2015 | Westphal | ............... | H04L 45/44 |
| | | | | 709/240 |
| 2015/0180769 A1* | 6/2015 | Wang | ...................... | H04L 45/38 |
| | | | | 370/236 |
| 2017/0005923 A1 | 1/2017 | Babakian | | |
| 2018/0101868 A1* | 4/2018 | Reis | ................... | G06Q 30/0258 |
| 2019/0124013 A1* | 4/2019 | Murugesan | ............. | H04L 45/76 |
| 2020/0213154 A1 | 7/2020 | Han et al. | | |
| 2021/0119971 A1* | 4/2021 | Radhakrishnan | ....... | H04W 4/70 |
| 2022/0393974 A1* | 12/2022 | Wen | ...................... | H04L 45/742 |
| 2022/0417096 A1 | 12/2022 | Vutukuri et al. | | |
| 2025/0039130 A1* | 1/2025 | Mestery | ............. | H04L 63/0236 |
| 2025/0039140 A1* | 1/2025 | Rolando | ............. | G06F 9/45558 |

OTHER PUBLICATIONS

Extended European Search Report for European Patent Application No. 24208878.9 dated Jan. 16, 2025. 11 pages.
R. Singh, et al.: "Optimal Routing for Delay-Sensitive Traffic in Overlay Networks," Apr. 18, 2019, https://arxiv.org/abs/1703.07419.

* cited by examiner

*Primary Examiner* — J. Brant Murphy
(74) *Attorney, Agent, or Firm* — Lerner David LLP

(57) ABSTRACT
Technique or mechanism in which network security policies are applied close to the source or origin associated with policy decisions. For example. the disclosed technology moves dropped flows from a firewall cluster to a leaf switch based on host location.

20 Claims, 6 Drawing Sheets

OVERLAY (BLUE)

OVERLAY (GREEN)

OVERLAY (ORANGE)

Underlay (PHYSICAL)

123 tunnels

100

200

300

400

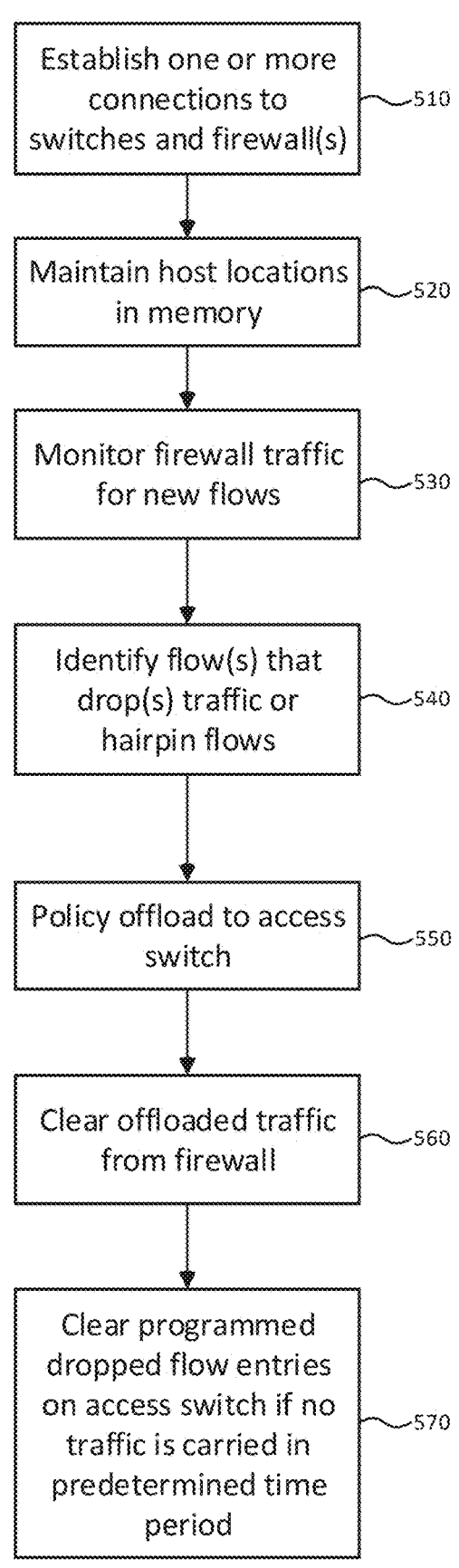

Establish one or more connections to switches and firewall(s) ~510

Maintain host locations in memory ~520

Monitor firewall traffic for new flows ~530

Identify flow(s) that drop(s) traffic or hairpin flows ~540

Policy offload to access switch ~550

Clear offloaded traffic from firewall ~560

Clear programmed dropped flow entries on access switch if no traffic is carried in predetermined time period ~570

Computing Device

604 — Memory

608 — Data

612 — Instructions

616 — Processing element (e.g., processor)

620 — Module(s)

I/O Intf.

630

<u>600</u>

POLICY AND TRAFFIC MANAGEMENT IN AN OVERLAY NETWORK

BACKGROUND

Network policy involves using rules to control the behavior of devices on a network that includes the devices. These rules impact the flow of traffic on the network and between networks. For example, the policy may function to secure communications that take place on the network by preventing certain devices from communicating with other devices or preventing access to certain data. Network security policies are typically implemented via firewalls. A firewall is generally considered a network security device that monitors network traffic and allows or blocks such traffic based on a defined set of security rules.

In modern day computing, physical or underlay networks are typically configured to support multiple virtual networks as overlay networks. An overlay network is a virtual network built on top of a physical or underlay network using tunneling protocols and control plane protocols. In a cloud computing environment, overlay networks can be used to provide isolation and security for tenant systems. For instance, overlay networks may be configured, via a security policy, to prevent tenant systems from communicating with each other, or to allow only specific communications between certain systems.

SUMMARY

In general, the disclosed technology is a technique or mechanism in which network security policies are applied close to the traffic source or origin associated with policy decisions. In one aspect, the disclosed technology moves dropped flows from the firewall cluster to an access switch based on host location. In an example, the disclosed technology is applied to virtual or overlay networks that are implemented using an underlay spine-leaf CLOS topology. In such a topology, the underlay network is composed of access leaf switches, spine switches and border leaf switches that are used to couple tenant systems to a firewall cluster and to a Wide Area Network (WAN). An aspect of the disclosed technology is applying a security policy at an access leaf switch associated with a tenant system, e.g., an access leaf switch that serves as ingress switch for the tenant system. In this regard, while the traffic or data flows being managed are associated with one or more overlay networks, the network policies that manage the traffic or data flows are also associated with the switches and other network elements that make up the underlay or physical network.

The disclosed technology may be practiced as a method, apparatus, or system. For example, in one aspect the disclosed technology may be a method for managing network traffic associated with an overlay network. The method comprises detecting, using a controller, a traffic flow associated with the overlay network; determining a location of a host associated with the traffic flow; and causing, by the controller, the traffic flow to be offloaded to an access switch associated with the host based on the determined location of the host. In accordance with this aspect of the disclosed technology, determining comprises tracking the location of the host using the host MAC address and one or more IP addresses. In this regard, tracking the location of the host may comprise storing an IP address of the access switch and a port address of the host. Further, tracking can be done using any one of an overlay control protocol, telemetry, element management system information or OpenFlow protocol.

Further in accordance with this aspect of the disclosed technology, detecting comprises identifying drop flow entries on a firewall cluster associated with the host. In this regard, identifying comprises identifying 3-tuple or 5-tuple drop flow entries on the firewall cluster associated with the dropped traffic flow.

Further in accordance with this aspect of the disclosed technology, causing the traffic to be offloaded comprises programming, by the controller, the traffic flow on the access switch. Further still, the access switch is an access leaf switch used by the host as an ingress switch to the overlay network. In addition, the method may also comprise clearing the traffic flow at a firewall cluster used by the host in communicating over the overlay network.

Further in accordance with this aspect of the disclosed technology, the traffic flow comprises a traffic flow identified by the controller as being dropped at a firewall cluster associated with the firewall controller. Further still, the method may comprise clearing the traffic flow at the access switch.

Further in accordance with this aspect of the disclosed technology, the traffic flow comprises a dropped traffic flow resulting from enforcing a network security policy. Further, the traffic flow can comprise a hairpinning traffic flow. In addition, the controller comprises a firewall controller.

Another aspect of the disclosed technology is a system for managing network traffic associated with an overlay network. The system includes a controller that detects traffic flow associated with the overlay network; determines a location of a host associated with the traffic flow; and communicates with an access switch associated with the host based on the determined location of the host and causes the traffic flow to be offloaded to the access switch.

In accordance with this aspect of the disclosed technology, the controller determines the location of the host by tracking the location of the host using the host MAC address and one or more IP addresses. Further, the controller determines the location of the host by tracking the location of the host using the host MAC address and one or more IP addresses. Further still, the controller tracks the location of the host by storing an IP address of the access switch and a port address of the host as host location information. Further still, the controller tracks the location of the host using any one of an overlay control protocol, telemetry, element management system information or OpenFlow protocol. Further still, the controller detects traffic flow by identifying drop flow entries on a firewall cluster associated with the host. In addition, identifying comprises identifying 3-tuple or 5-tuple drop flow entries on the firewall cluster associated with the dropped traffic flow.

Further in accordance with this aspect of the disclosed technology, the controller causes the traffic flow to be offloaded to the access switch by programming the traffic flow on the access switch. Additionally, the access switch is an access leaf switch used by the host as an ingress switch to the overlay network. Further still, the controller causes the traffic flow at a firewall cluster used by the host in communicating over the overlay network to be cleared. Further, the traffic flow comprises a traffic flow identified by the controller as being dropped at a firewall cluster associated with the firewall controller. Further still, the controller causes the traffic flow at the access switch to be cleared.

Further in accordance with this aspect of the disclosed technology, the traffic flow comprises a dropped traffic flow resulting from enforcement of a network security policy at a firewall cluster. Further still, the traffic flow comprises a hairpinning traffic flow. In addition, the controller comprises a firewall controller.

Another aspect of the disclosed technology is an apparatus managing network traffic in an overlay network. The apparatus may comprise a controller having a processing element; and a memory having instructions that cause the processing element to: detect traffic flow associated with the overlay network; determine a location of a host associated with the traffic flow; and communicate with an access switch associated with the host based on the determined location of the host and causes the traffic flow to be offloaded to the access switch. The instructions may also cause the processing to perform one or more the functions of the system aspect or one or more steps of the method aspect.

BRIEF DESCRIPTION OF THE DRAWINGS

FIG. 5 illustratively depicts a method or process in accordance with an aspect of the disclosed technology.

DETAILED DESCRIPTION

In an example, the disclosed technology is applied to virtual or overlay networks that are implemented using an underlay spine-leaf CLOS topology. In such a topology, the underlay network is composed of access leaf switches, spine switches and border leaf switches that are used to couple tenant systems to a firewall cluster and to a Wide Area Network (WAN). A controller establishes control sessions with the elements, e.g., the switches, firewall, etc., on the underlay network. When the controller detects an anomaly associated with a traffic flow, the controller determines the host associated with the traffic flow and the access leaf switch the host uses as an ingress point into the overlay network. The controller then reprograms the access leaf switch to include a policy programmed on the firewall cluster that enforces network policies associated with the overlay network so as to control traffic flow associated with the host. The reprogrammed access switch then enforces the policy at the access switch so that the traffic flow does not waste network resources, e.g., bandwidth, and mitigates against creating bottlenecks on the underlay network.

Figure 1:
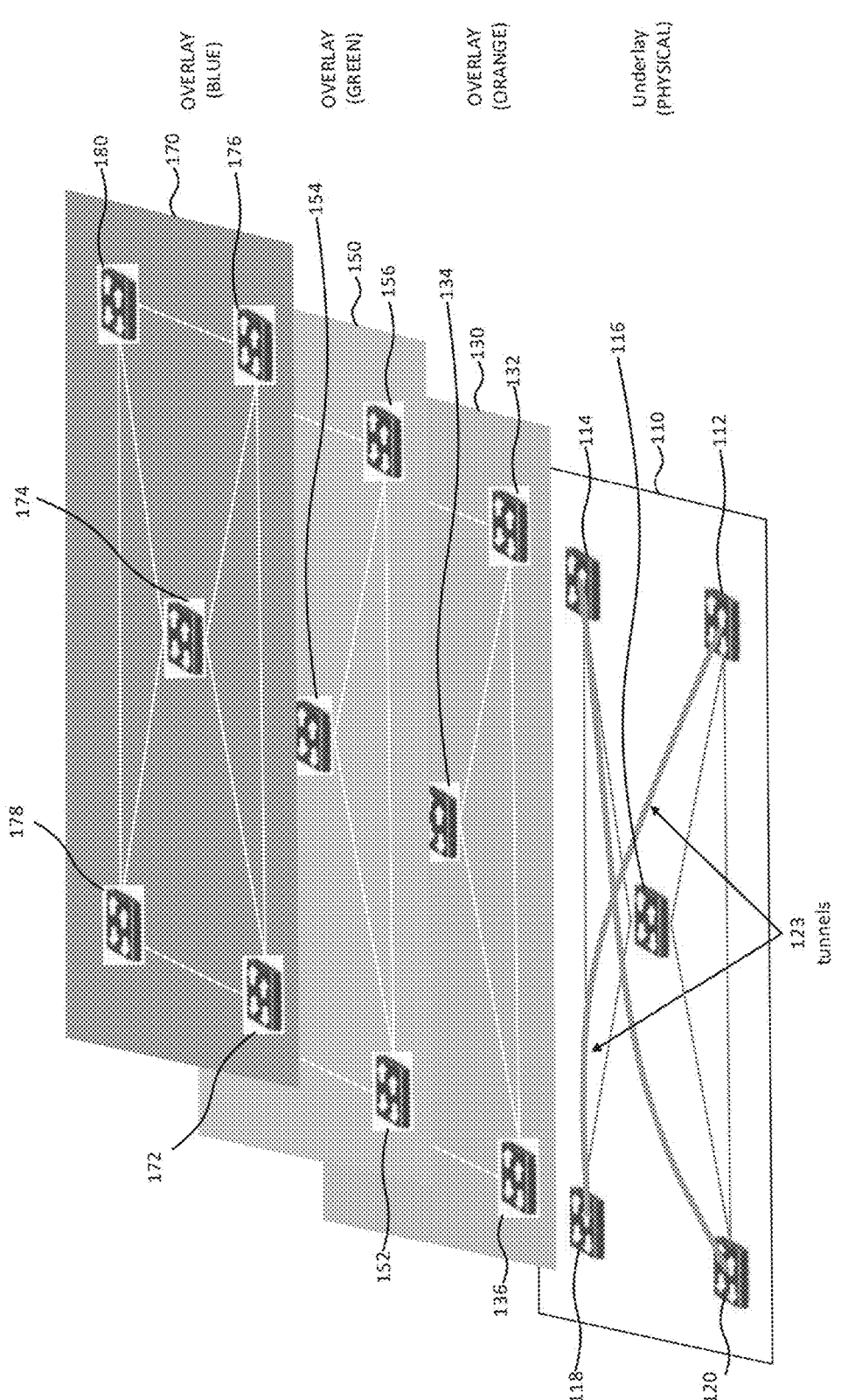
FIG. 1 illustratively depicts an example of overlay or virtual networks on an underlay or physical network in accordance with an aspect of the disclosed technology.

FIG. 1 illustratively depicts a network architecture 100 in accordance with an aspect of the disclosed technology. The network architecture 100 includes a physical or underlay network 110 and a number of overlay or virtual networks 130, 150, 170. Though only three overlay networks are shown, in an actual implementation, the network architecture 100 may include additional overlay or virtual networks or less than three overlay or virtual networks.

As illustrated by FIG. 1, the physical or underlay network 110 includes a number of network elements 112, 114, 116, 118, and 120. These network elements include, for example, switches, routers, servers, and cables and/or fibers that interconnect the network elements. The underlay network 110 may include other infrastructure but to avoid overcomplicating the diagram only a limited number of network elements are shown. In some examples, the switches and routers that form the infrastructure of network architecture 100 may be implemented using servers. The network elements may be physical network elements or may be virtual network elements implemented on host machines.

The physical network architecture 100 may be implemented in a datacenter and used to connect hosts or tenant systems within the datacenter to each other or to hosts or tenant systems residing at other datacenters. The physical network architecture 100 may, for example, be used to connect a datacenter to a wide area network (WAN) allowing for interconnections with other host machines and/or client devices. Host machines may be physical or virtual hosts. In an office environment, a host can be a laptop or a desktop machine. In cloud computing, e.g., in a data center, hosts could be physical servers or virtual machines. Client devices may include desktop machines, laptops, cell/smartphones and, more generally, a computing device capable of communicating over a network.

As shown in FIG. 1, the network elements 112, 114, 116, 118, and 120 are configurable to support one or more tunnels 123. Overlay networks 130, 150, and 170 are implemented using the one or more tunnels 123. As previously discussed, an overlay network is a virtual or logical network built on top of a physical network using tunneling protocols and control plane protocols. The tunneling protocols may include VXLAN (Virtual Extensible Local Area Network), NVGRE (Network Virtualization using Generic Routing Encapsulation) and GENEVE (Generic Network Virtualization Encapsulation). The control protocols can include EVPN (Ethernet Virtual Private Network).

Overlay networks 130, 150, and 170 create a layer that allows traffic to be transported via virtual network routes or paths in lieu of having to specify actual physical links. Each of overlay networks 130, 150, and 170 include a plurality of network elements. For instance, overlay network 130 is shown as having network elements 132, 134, and 136. Overlay network 150 is shown as having network elements 152, 154, and 156. Overlay network 170 is shown as having network elements 172, 174, 176, 178, and 180. The network elements on overlay networks 130, 150, and 170 are typically virtual network elements, such as, for example, virtual switches, network interface cards, routers, etc. A virtual switch facilitates communications between virtual machines, and, in effect, between hosts. A virtual network interface card (VNIC) functions as a physical NIC. These virtual network elements may reside on physical or virtual hosts.

Overlay networks are often used in cloud computing environments and datacenter networks. Such networks are typically used to support one or more tenant networks. Each tenant network has its own hosts, also known as tenant systems. These hosts are connected to each other through an overlay network. The overlay network can provide Layer 2 and Layer 3 connectivity between the tenant systems and external networks. This means that the tenant systems can communicate with each other and with systems on the outside world, even though they may be located in different physical locations. The overlay network can also provide security and isolation for the tenant systems by segmenting traffic and restricting access by groups, individuals, or devices. For example, a security policy can be configured to prevent tenant systems from communicating with each other, or to only allow communication with specific systems on the outside world.

As such, overlay networks can enhance security. In overlay networks, security policies are typically implemented centrally in a firewall cluster. Under certain circumstances, the firewall cluster may become a bottleneck contributing to inefficient use of bandwidth by dropping flows in enforcing a security policy, which continue to consume resources, such as flow entries, on the firewall. Aspects of the disclosed address such inefficiencies.

Figure 2:
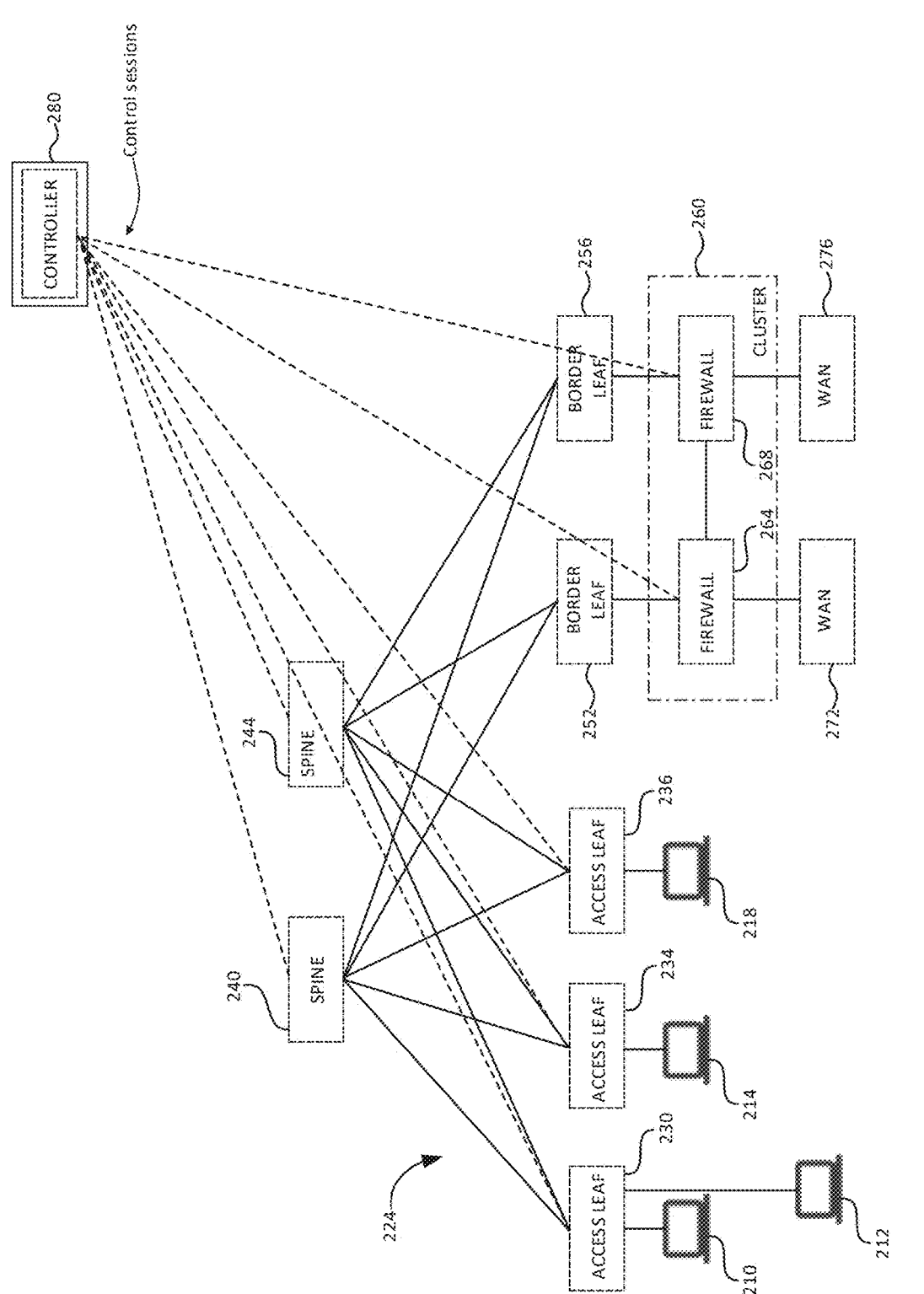
FIG. 2 illustratively depicts an example of an underlay or physical network in accordance with an aspect of the disclosed technology.

FIG. 2 shows an example of a system 200 in accordance with an aspect of the disclosed technology. The system 200 includes a number of host machines or hosts 210, 212, 214, and 218 that communicate via an overlay network that is implemented using an underlay spine-leaf CLOS topology 224. In some examples, each host machine 210, 212, 214, and 218 may be considered as a separate tenant system that communicates with a given access leaf switch. Host machines may be physical or virtual hosts. In an office environment, a host can be a laptop or a desktop machine. In cloud computing, e.g., in a data center, hosts could be physical servers or virtual machines. In the spine-leaf CLOS topology of FIG. 2, the underlay network 224 is composed of access leaf switches, spine switches and border leaf switches that are used to couple tenant systems to a firewall cluster and to a Wide Area Network (WAN).

Specifically, underlay network 224 includes access leaf switches or access switches 230, 234, 236. Each access leaf switch is associated with a given host. That is, access leaf switch 230 is associated with host 210 and 212, access leaf switch 234 with host 214, and access leaf switch 236 with host 218. Each access leaf switch couples its associated machine to the overlay network 224 and, in effect, functions as an ingress or egress point for its respective. Each access leaf switch is coupled to each of spine switches 240, 244. Each spine switch 240, 244 is coupled to each border leaf switch 252, 256. The border leaf switches 252, 256 are coupled to a firewall cluster 260. The firewall cluster 260 includes a first firewall 264 and a second firewall 268. As indicated above, a firewall is generally considered a network security device that monitors incoming and outgoing network traffic and allows or blocks such traffic based on a defined set of security rules. Accordingly, firewalls 264, 268 are network security devices. Firewalls 264 and 268 are coupled, respectively, to WAN 272 and WAN 276.

Spine switches aggregate traffic from access leaf switches. The border leaf switches are special purpose switches that route traffic between different overlay or virtual networks, each associated with a different host in FIG. 2, and external WANs. The firewall cluster manages the traffic flow by enforcing a security policy that controls communications between hosts and between a given host and the WANs. FIG. 2 shows a limited number of switches, firewalls and WANs as forming the infrastructure to simplify the drawing. An actual implementation may include many more switches, firewalls, and WANs as part of the infrastructure, in addition to many more hosts.

As shown in FIG. 2, the system includes controller 280. Controller 280 is capable of establishing control sessions with switches 230, 234, 236, 240, 244 and firewalls 264, 268. Controller 280 connects to a switch if it needs to establish a control session to participate in the overlay network to collect information, or to program data flows via the overlay network. In establishing a control session, controller 280 connects to spine switches 240, 244. To collect information or program data flows, controller 280 connects to the firewall 264 and/or 268 and to one or more of the access leaf switches 230, 234, and/or 236. In the example of FIG. 2, controller 280 is not shown as coupled to border leaf switches 252, 256 as in this instance controller 280 does not require information from the border leaf switches 252, 256 and does not program them. In other examples, a controller, e.g., controller 280 described herein, may be coupled to the border leaf switches and interact with them, e.g., collect information or program them, depending on the implementation.

Controller 280 is implemented as part of the control plane. The type of connections between controller 280 and the access and/or spine leaf switches is implementation dependent and may use any one or more of the following:
    MP-BGP EVPN (Multiprotocol Border Gateway Protocol EVPN) connections to the switches to learn the EVPN advertisements;
    Telemetry connections to the switches and firewall;
    Connections to the EMS(s) (Element Management Systems) of the switches and the firewall;
    OpenFlow session to the switches; or
    P4 API (Programming Packet Protocol-Independent Packet Processors (P4) Application Programming Interface (API))
    If host 210 has a stream of data or packets to send to host 218, the stream of data is routed through access leaf switch 210, spine switch 240 or 244, border leaf switch 252 or 256 to the firewall cluster 260. A firewall 264 or 268 determines whether host 210 is allowed to communicate with host 218. If it is determined that such communication is allowed, the firewall 264 or 268 allows the stream of data to travel to its destination, i.e., host 218, through border leaf switch 252 or 254, spine switch 240 or 244, and access leaf switch 236. On the other hand, if the firewall 264 or 268 determines that host 210 is not allowed to communicate with host 218, it prevents the communication by dropping the stream of data or packets at the firewall cluster 260. As a result, in this latter case, bandwidth is being used to transport the stream of data or packets from host 210 to the firewall cluster 260, where they are dropped in enforcing the security policy. This can create a bottleneck at the firewall cluster 260, as well as waste bandwidth that may otherwise be used by other communications needed to be carried over the network 224.

In accordance with the disclosed technology, such bottlenecks and waste of network resources can be mitigated or avoided. In the example operation where communications between host 210 and host 218 are not permitted by the firewall, the disclosed technology operates as follows. While communications between host 210 and host 218 are not permitted, host 210 nevertheless will generate such packets and send them to access leaf switch 230. The data packets are thereby routed to firewall cluster 260 through overlay network 224 via access leaf switch 230, spine leaf switch 240 or 244 and border leaf switch 252 or 256. As previously discussed, upon arriving at the firewall cluster 260, it is determined that communications between host 210 and host 218 are not permitted and therefore the stream of data packets cannot be forwarded to host 218 and therefore must be dropped. In accordance with the disclosed technology, the controller determines the access leaf switch associated with host 210, i.e., access leaf switch 230, based on the location of host 210 and programs the dropped flows on access leaf switch 230 as part of a policy offloading operation. As a result, the traffic is dropped at access leaf switch 230. This avoids wasting network resources in transporting the stream of packets generated by host 210 to the firewall cluster only to have those packets dropped in accordance with the security policy. Accordingly, the potential bottleneck that would have resulted along the communication path between host 210 and the firewall cluster 260 caused by a stream of packets generated by host 210 can be avoided.

Another example of the disclosed technology is to avoid data flow hairpinning. For instance, the source and destination for a data or traffic flow may be connected to network 224 via the same access leaf switch. As such, the same access leaf switch serves as the ingress and egress point for the data or traffic flow. More specifically, such a use case can occur when host 210 seeks to send a stream of data from host 210 to host 212. Specifically, the stream of data generated by host 210 and destined for host 212 would be transported along a path that includes access leaf switch 230, spine switch 240 or 244, border leaf switch 252 or 256 to firewall cluster 260. Firewall cluster 260, in accordance with a network policy, would either allow the stream of data to flow back over the network (via the same transport path or a different one) back to access leaf 230 and on to host 212 if permitted; or, alternatively, drop the flow at cluster 260 if not permitted. In either case, because the network policy is enforced at the firewall cluster the data or traffic flow is transported over network 224.

If the network policy enforced at the firewall cluster 260 is offloaded to access leaf switch 230, such data or traffic flow need not traverse network 224. Instead, access leaf switch 230 enforces policy. As such, access leaf switch 230 either can either allow the traffic or data flow from host 210 to continue on to host 212 or drop it. In either case, network resources that would otherwise be used to transport such traffic over network 224 is avoided. Such resources may be used by other traffic.

Hairpinning is discussed above in terms of hosts 210 and 212. Hosts 210 and 212 may be virtual hosts on the same physical machine or server or be separate physical machines. In some instances, hairpinning can also occur where virtual machines on the same physical machine or host are required to communicate with each other to carry out some service or perform a calculation. Offloading the network policy to access leaf switch should prove advantageous in either circumstance by mitigating against unnecessary use of network resources, which impacts operational costs, and avoid creating bottlenecks. In addition, in the case of hairpinning where the traffic or data flow is not dropped, the delay of having the data transported to the firewall cluster is avoided.

As indicated above, the controller programs the flows on the access leaf switches which results in the firewall cluster offloading the security policy associated with the dropped traffic to the access leaf switch associated with the host whose traffic is being dropped. In accordance with the disclosed technology, that access leaf switch is determined based on location information. Specifically, the location of a host is tracked in the overlay network connecting the host to the firewall cluster, as well as other hosts and networks. Specifically, in an overlay network a host can be identified by its MAC address and one or more IP addresses, e.g., IPv4 or IPv6addresses. Location identifies the access leaf switch (i.e., its IP address) and, optionally, the switch port where the host is connected. While the example of FIG. 2 is a spine leaf CLOS topology. the disclosed technology may be applied in other topologies. In general, the technology applies in other network topologies where the network policy can be offloaded to the switch, or more generally network element, that functions as the ingress point for the source of the dropped data stream or flow.

Location tracking may be done using mechanisms available via overlay control protocols, e.g., by tracking EVPN RT-2 MAC/IP advertisements. Alternatively, location tracking may be done using telemetry data from the access leaf switches. In accordance with this alternative, the state of access leaf switches are monitored using telemetry.

Other methods of location tracking include using element management systems (EMSs) or the OpenFlow protocol.

As part of the offloading operation, the drop flow entries on the firewall cluster are identified by the controller for a given host, e.g., the host impacted by the dropped flows. Such identification may take the form of a 3-tuple (source address, destination address, protocol) or 5-tuple (source address, destination address, source port, destination port, protocol) flow entries. Such information may be obtained from EMSs of the firewall cluster or telemetry data from the firewall cluster.

Once the relevant drop flows are identified, they are then installed, by the controller, on the access leaf switches associated with such flows based on the location of the host(s). The drop flows can be programmed on the associated leaf switch using an OpenFlow hybrid switch, i.e., flow look up happens before the traditional Layer 2/Layer 3 forwarding pipeline. Other alternatives include a custom P4 block in the pipeline or access control lists.

Once the relevant drop flows are moved to the appropriate access leaf switch the flow entries can be deleted from the firewall. This results in freeing up the resources earmarked for use by the relevant drop flows. In this way, those resources may be used by other traffic. This avoids wasting such resources between the relevant access switch and the firewall cluster—allowing those resources to be used to carry other traffic or data flows. As another feature of the disclosed technology, drop flows are reprogrammed when a host moves from one access leaf to another.

The technology may be implemented as a process or method by a controller 280 associated with the network. For instance, the process at a high level may operate as follows. The controller maintains a host location table in memory that records the location of each host. Such location includes the location information described above, e.g., host MAC address and one or more IPv4/IPv6 address and the access leaf switch where the host is connected. The controller monitors the firewall cluster for new drop flows. When a new drop flow is identified, the controller references the host location table and determines if there is a host associated with the dropped flow. If there is a matching entry for a host, the controller programs the flow on the access switch associated with the host and takes the additional steps discussed above.

Figure 3:
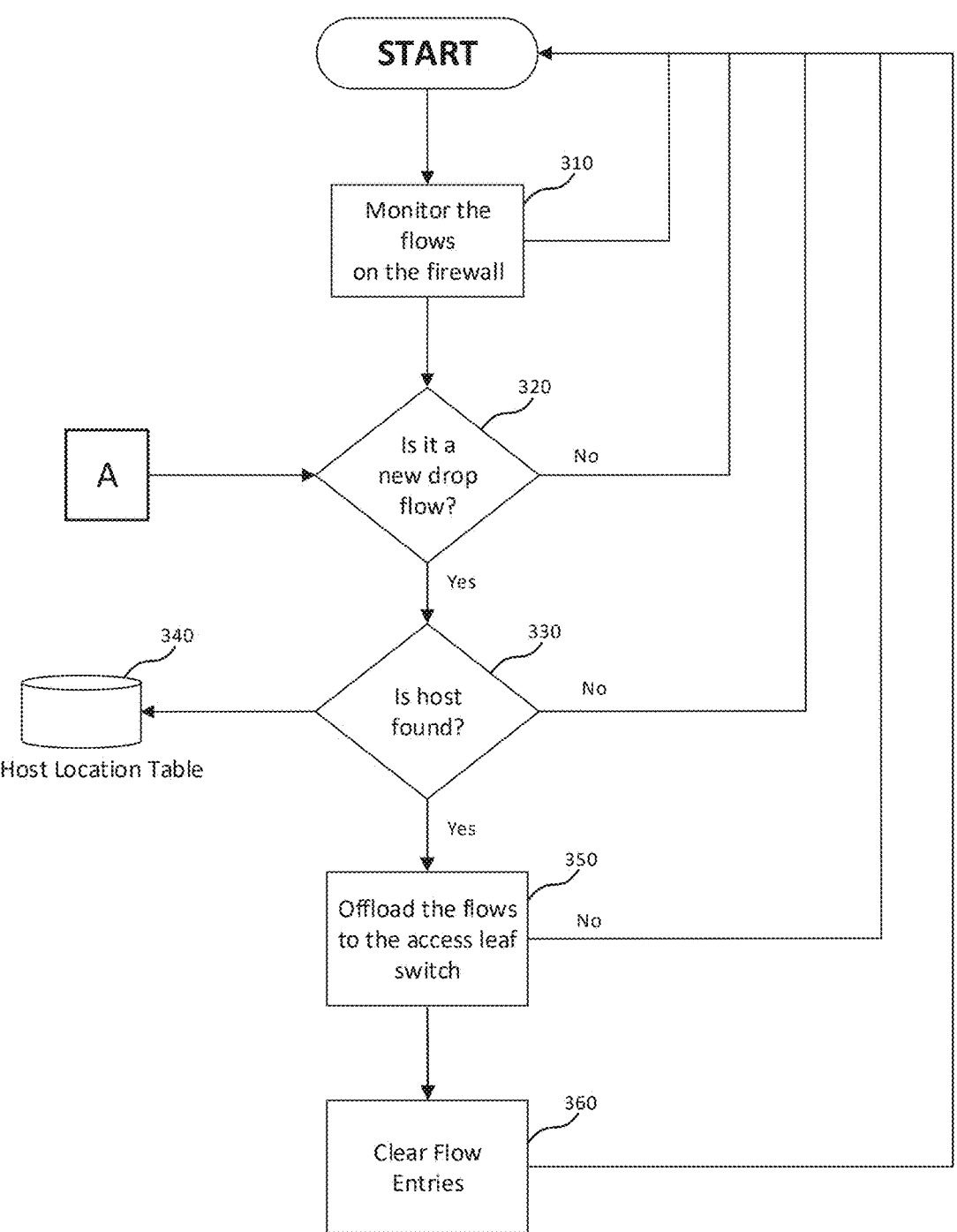
FIG. 3 illustratively depicts a method or process in accordance with an aspect of the disclosed technology.

FIG. 3 illustratively depicts a process or method 300 in accordance with an aspect of the disclosed technology. At step 310, the process monitors the flows at a firewall. The monitored flows are checked, at step 320, to identify drop flow entries on the firewall cluster for a given host. The drop entries could be 3 or 5 tuple entries as discussed above. The entry information can be identified using an EMS of the firewall cluster, or telemetry data from the firewall cluster.

When a new drop flow is detected, the process continues to step 330, a determination is made of the location of the host associated with the drop flow. This determination is made by accessing a host location table 340. As indicated above, host location can be identified based on the host's MAC address and IP addresses. If a host is located at step 330, the process continues to step 350 where the relevant traffic flow(s) are offloaded to the appropriate leaf switch based on the location of the host. Offloading involves installing drop flows on the access leaf switches for the dropped flows based on the host location. These flows can be installed or programmed using any of the following options: an OpenFlow Hybrid switch, as such flow look would happen before the L2/L3 forwarding pipeline; a custom P4 block in the pipeline; or access control lists.

As shown in FIG. 3, offloaded flows are cleared on the firewall at step 360. This frees up network resources. The process returns to step 310, if a new drop flow is not found at step 320 or the host is not located at step 330, as well at step 350 if the process offloads flows after dropped flow entries are cleared at step 360. As mentioned above, drop flows are also reprogrammed when a host moves from one access leaf switch to another.

Figure 4:
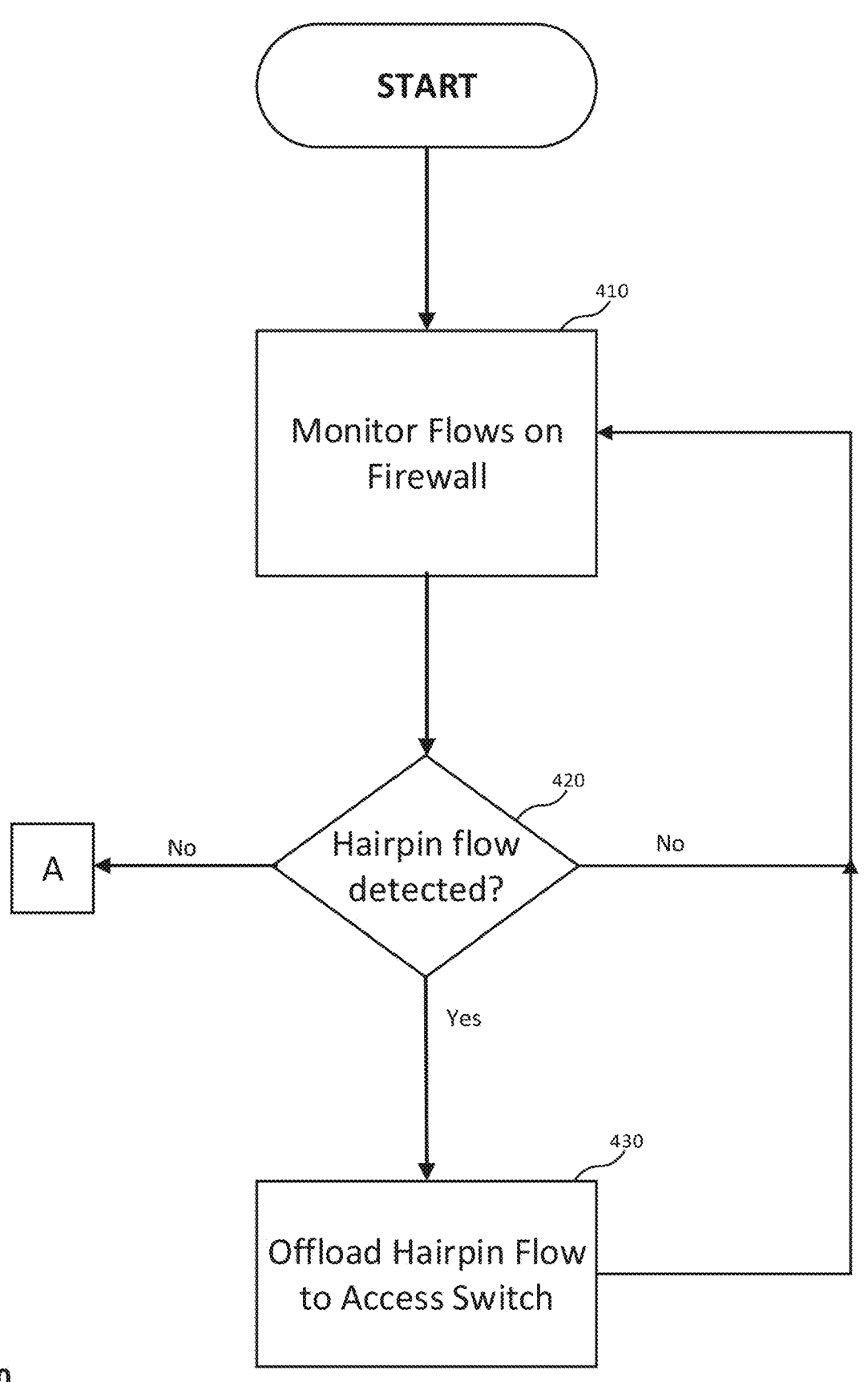
FIG. 4 illustratively depicts a method or process in accordance with an aspect of the disclosed technology.

FIG. 4 illustratively depicts a process or method 400 in accordance with an aspect of the disclosed technology. Process flow 400 operates to detect hairpin flows and offload the policy associated with such flows to the appropriate access leaf switch. As shown, process 400 may run in parallel with process 300 or be integrated into process 300 via branch A.

As step 410, process 400 monitors the flows at a firewall. If a hairpin flow is detected at step 420, the process continues to step 430. A hairpin can be detected at step 420 by identifying the hosts' location associated with the source and destination of the data flow. As discussed above, the identity of a host can be identified based on a MAC and one or more IP addresses. If the source address and destination address are associated with the same access leaf switch, this would be an indication of a hairpin. In such a circumstance, as indicated at step 430 the firewall can offload the network policy to the access leaf associated with that host.

FIG. 5 illustratively depicts a method or process of operation 500 of a controller, such as controller 280, in accordance with an aspect of the disclosed technology. Controller 280 in some examples is a hardware device configured to perform the process or method discussed above. In other examples, controller 280 is a software program that is integrated into the network and executed by a hardware device. A controller in accordance with the disclosed technology participates in the underlay network to establish IP connectivity to all the switches and the firewall cluster, or if no cluster the firewall device(s) associated with the network.

As shown at step 510, the controller establishes one or more connections with the switches and firewall cluster of the underlay network. The type of connection may comprise any one of the following: MP-BGP EVPN, telemetry, connection to the EMS, OpenFlow, and P4 API. At step 520, the controller discovers hosts on the network and their locations, and maintains a host location table. The host location table is maintained in a memory as a database in which a host is identified by its MAC address and one or more IP addresses.

At step 530, the controller monitors the firewall for new flows. The controller can be notified of new flows by the firewall cluster or EMS, or the controller can poll the firewall cluster for new flows.

At step 540, the controller then monitors the firewall for dropped traffic flows. When a flow is identified as dropping traffic, the controller consults the host location table. If there is a host that matches the dropped flow entry, the controller programs the flow on the access switch associated with the matched host. This step is referred to as policy offloading as shown at step 550. Policy offloading may be implemented through OpenFlow operations, P4 APIs or network device specific APIs or commands.

The decision to offload policies may be governed by administrative policies such as:

Prefixes-source and/or destination addresses

Specific MAC addresses

Specific protocols-Example: Offload only certain protocol traffic

Traffic rate-Offload only when traffic rate is above certain value

Traffic direction-Offload only the east-west traffic.

Network remediation-Perform offloading only when some part of the network is down Vulnerability enforcement-Perform offloading based on the vulnerability state of a host.

The controller may be further optimized as shown at step 560 to clear flow entries on the firewall that have been dropped. Further, as shown at step 570, dropped flow entries programmed on an access switch will be cleared if there is no traffic matching the flow entry for a configurable amount of time. The amount of time can be configurable by a user to a time period on the order of seconds to a few minutes.

Figure 6:
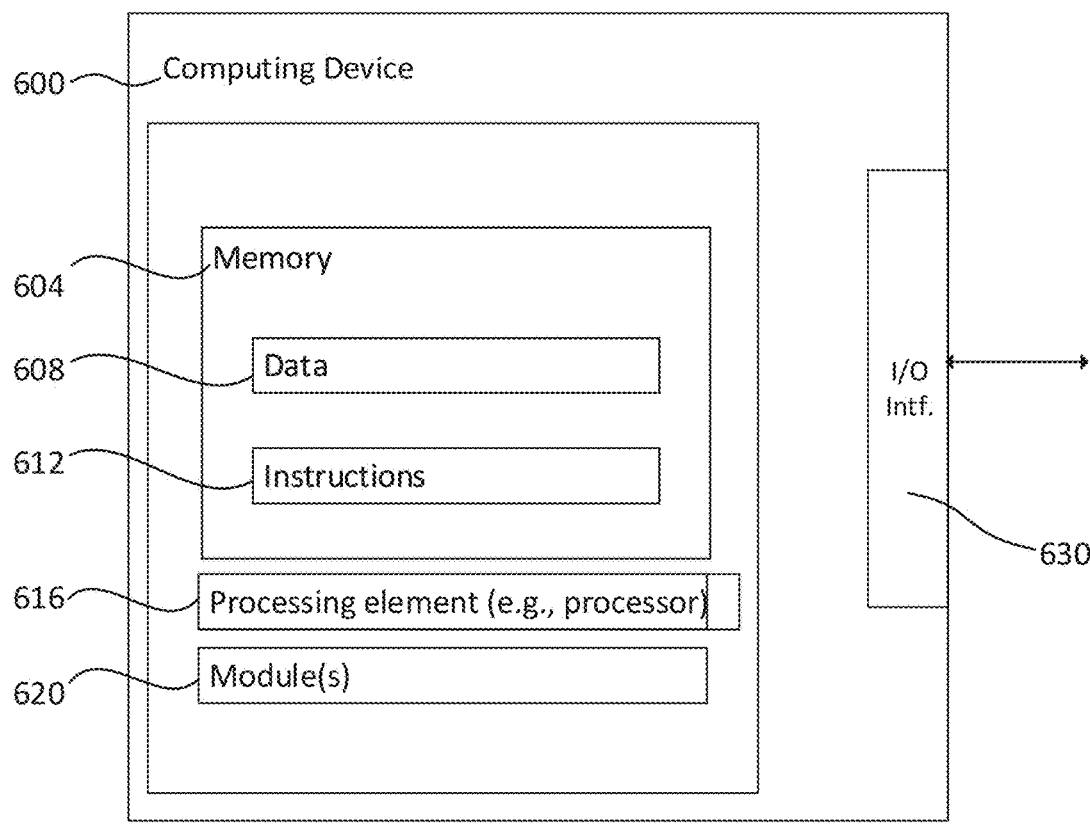
FIG. 6 illustrates an example of a controller in accordance with an aspect of the disclosed technology.

FIG. 6 illustrates an example of hardware device 600 configured to operate as controller 280. Hardware device 600 is an example computing device which can carry out the instructions of a program or software that implements the functions of a software controller, such as for example controller 280 of FIG. 2. The computing device 600 may be used to implement the processes discussed above, including the processes depicted in FIGS. 3, 4 and 5.

The computing device 600 can take on a variety of configurations, such as, for example, a controller or microcontroller, a processor, or an ASIC, such as a graphics processing unit (GPU) or tensor processing unit (TPU). In some instances, computing device 600 may comprise a server or host machine that carries out the operations discussed above. In other instances, such operations may be performed by one or more computing devices in a data center. The computing device may include memory 604, which includes data 608 and instructions 612, and a processing element 616, as well as other components typically present in computing devices (e.g., input/output interfaces for a keyboard, display, etc.; communication ports for connecting to different types of networks).

The memory 604 can store information accessible by the processing element 616, including instructions 612 that can be executed by processing element 616. Memory 604 can also include data 608 that can be retrieved, manipulated, or stored by the processing element 616. Memory 604 can operate as the host location database discussed above, and may also store flow entries and any other data used by the processing element 616 to carry out the processes of the disclosed technology. The memory 604 may be a type of non-transitory computer-readable medium capable of storing information accessible by the processing element 616, such as a hard drive, solid state drive, tape drive, optical storage, memory card, ROM, RAM, DVD, CD-ROM, write-capable, and read-only memories. The processing element 616 can be a well-known processor or other lesser-known types of processors. Alternatively, the processing element 616 can be a dedicated controller such as an ASIC.

The instructions 612 can be a set of instructions executed directly, such as machine code, or indirectly, such as scripts, by the processor 616. In this regard, the terms "instructions," "steps," and "programs" can be used interchangeably herein. The instructions 612 can be stored in object code format for direct processing by the processor 616, or can be stored in other types of computer language, including scripts or collections of independent source code modules that are interpreted on demand or compiled in advance. For example, the instructions 612 may include instructions to carry out the methods and processes discussed above in relation to technique and mechanisms to offload flows to access switches as discussed in relation to FIGS. 1 through 5.

The data 608 can be retrieved, stored, or modified by the processor 616 in accordance with the instructions 612. For instance, although the system and method are not limited by a particular data structure, the data 608 can be stored in computer registers, in a relational database as a table having a plurality of different fields and records, or in XML documents. The data 608 can also be formatted in a computer-readable format such as, but not limited to, binary values, ASCII, or Unicode. Moreover, the data 608 can include information sufficient to identify relevant information, such as numbers, descriptive text, proprietary codes, pointers, references to data stored in other memories, including other network locations, or information that is used by a function to calculate relevant data.

FIG. 6 functionally illustrates the processing element 616 and memory 604 as being within the same block, but the processing element 616 and memory 604 may instead include multiple processors and memories that may or may not be stored within the same physical housing. For example, some of the instructions 612 and data 608 may be stored on a removable CD-ROM and others may be within a read-only computer chip. Some or all of the instructions and data can be stored in a location physically remote from, yet still accessible by, the processing element 616. Similarly, the processing element 616 can include a collection of processors, which may or may not operate in parallel.

The computing device 600 may also include one or more modules 620. Modules 620 may comprise software modules that include a set of instructions, data, and other components (e.g., libraries) used to operate computing device 600 so that it performs specific tasks. For example, the modules may comprise scripts, programs, or instructions to implement one or more of the functions associated with the modules or components discussed in FIGS. 3 and 4. The modules 620 may comprise scripts, programs, or instructions to implement the process flow of FIGS. 3 through 5.

Computing device 600 may also include one or more input/output interface 630. Interface 630 may be used to communicate with the switches and firewall to obtain host location information, establish control sessions with the switches and firewall, program the access switches and otherwise carry out the functions involved in implementing offloading process, clearing flow entries, or dropping unused entries at reprogrammed access switches. Each output port may comprise an I/O interface that communicates with local and wide area networks.

The disclosed technology may be practiced as a method, apparatus or system that includes the following features and sub-features:

F1. A method for managing network traffic associated with an overlay network, comprising:
  detecting, using a controller, a traffic flow associated with the overlay network;
  determining a location of a host associated with the traffic flow; and
  causing, by the controller, the traffic flow to be offloaded to an access switch associated with the host based on the determined location of the host.
F2. The method of F1, wherein determining comprises tracking the location of the host using the host MAC address and one or more IP addresses.
F3. The method of F2, wherein tracking the location of the host comprises storing an IP address of the access switch and a port address of the host.

F4. The method of F2, wherein tracking is done using one of an overlay control protocol, telemetry, element management system information or OpenFlow protocol.
F5. The method of any one of F1 to F4, wherein detecting comprises identifying drop flow entries on a firewall cluster associated with the host.
F6. The method of any one of F1 to F5, wherein identifying comprises identifying 3-tuple or 5-tuple drop flow entries on the firewall cluster associated with the dropped traffic flow.
F7. The method of any one of F1 to F6, wherein causing the traffic to be offloaded comprises programming, by the controller, the traffic flow on the access switch.
F8. The method of any one of F1 to F7, wherein the access switch is an access leaf switch used by the host as an ingress switch to the overlay network.
F9. The method of any one of F1 to F8, comprising clearing the traffic flow at a firewall cluster used by the host in communicating over the overlay network.
F10. The method of any one of F1 to F9, wherein the traffic flow comprises a traffic flow identified by the controller as being dropped at a firewall cluster associated with the firewall controller.
F11. The method of F10, comprising clearing the traffic flow at the access switch.
F12. The method of any one of F1 to F11, wherein the traffic flow comprises a dropped traffic flow resulting from enforcing a network security policy.
F13. The method of any one of F1 to F12, wherein the traffic flow comprises a hairpinning traffic flow.
F14. The method of any one of F1 to F13, wherein the controller comprises a firewall controller.
F15. A system for managing network traffic associated with an overlay network, comprising:
  a controller that:
    detects traffic flow associated with the overlay network;
    determines a location of a host associated with the traffic flow; and
    communicates with an access switch associated with the host based on the determined location of the host and causes the traffic flow to be offloaded to the access switch.
F16. The system of F15, wherein the controller determines the location of the host by tracking the location of the host using the host MAC address and one or more IP addresses.
F17. The system of F16, wherein the controller tracks the location of the host by storing an IP address of the access switch and a port address of the host as host location information.
F18. The system of any one of F15 to F17, wherein the controller tracks the location of the host using any one of an overlay control protocol, telemetry, element management system information or OpenFlow protocol.
F19. The system of any one of F15 to F18, wherein the controller detects traffic flow by identifying drop flow entries on a firewall cluster associated with the host.
F20. The system of F19, wherein identifying comprises identifying 3-tuple or 5-tuple drop flow entries on the firewall cluster associated with the dropped traffic flow.
F21. The system of any one of F15 to F20, wherein the controller causes the traffic flow to be offloaded to the access switch by programming the traffic flow on the access switch.
F22. The system of any one of F15 to F21, wherein the access switch is an access leaf switch used by the host as an ingress switch to the overlay network.

F23. The system of any one of F15 to F22, wherein the controller causes the traffic flow at a firewall cluster used by the host in communicating over the overlay network to be cleared.

F24. The system of any one of F15 to F23, wherein the traffic flow comprises a traffic flow identified by the controller as being dropped at a firewall cluster associated with the firewall controller.

F25. The system of F24, wherein the controller causes the traffic flow at the access switch to be cleared.

F26. The system of any one of F15 to F25, wherein the traffic flow comprises a dropped traffic flow resulting from enforcement of a network security policy at a firewall cluster.

F27. The system of any one of F15 to F26, wherein the traffic flow comprises a hairpinning traffic flow.

F28. The system of any one of F15 to F27, wherein the controller comprises a firewall controller.

F.29. A controller comprising:
a processing element; and
a memory having instructions that cause the processing element to:
  detect traffic flow associated with the overlay network;
  determine a location of a host associated with the traffic flow; and
  communicate with an access switch associated with the host based on the determined location of the host and causes the traffic flow to be offloaded to the access switch.

F.30. The controller of F29, wherein the instructions cause the processing element to perform any one of F16 to F28.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Although the technology herein has been described with reference to particular examples, it is to be understood that these examples are merely illustrative of the principles and applications of the disclosed technology. It is, therefore, to be understood that numerous modifications may be made to the illustrative examples and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only some but not all possible variations of the disclosed technology. Further, the same reference numbers in different drawings can identify the same or similar elements.

The invention claimed is:

1. A method for managing network traffic associated with an overlay network, comprising:
  detecting, using a controller, a traffic flow associated with the overlay network;
  determining a location of a host associated with the traffic flow; and
  causing, by the controller, the traffic flow to be offloaded to an access switch associated with the host based on the determined location of the host.

2. The method of claim 1, wherein determining comprises tracking the location of the host using the host MAC address and one or more IP addresses.

3. The method of claim 2, wherein tracking the location of the host comprises storing an IP address of the access switch and a port address of the host.

4. The method of claim 2, wherein tracking is done using one of an overlay control protocol, telemetry, element management system information or OpenFlow protocol.

5. The method of claim 1, wherein detecting comprises identifying drop flow entries on a firewall cluster associated with the host.

6. The method of claim 5, wherein identifying comprises identifying 3-tuple or 5-tuple drop flow entries on the firewall cluster associated with the dropped traffic flow.

7. The method of claim 1, wherein causing the traffic to be offloaded comprises programming, by the controller, the traffic flow on the access switch.

8. The method of claim 1, wherein the access switch is an access leaf switch used by the host as an ingress switch to the overlay network.

9. The method of claim 1, comprising clearing the traffic flow at a firewall cluster used by the host in communicating over the overlay network.

10. The method of claim 1, wherein the traffic flow comprises a traffic flow identified by the controller as being dropped at a firewall cluster associated with the firewall controller.

11. The method of claim 10, comprising clearing the traffic flow at the access switch.

12. The method of claim 1 wherein the traffic flow comprises a dropped traffic flow resulting from enforcing a network security policy.

13. The method of claim 1, wherein the traffic flow comprises a hairpinning traffic flow.

14. The method of claim 1, wherein the controller comprises a firewall controller.

15. A system for managing network traffic associated with an overlay network, comprising:
  a controller that:
    detects traffic flow associated with the overlay network;
    determines a location of a host associated with the traffic flow; and
    communicates with an access switch associated with the host based on the determined location of the host and causes the traffic flow to be offloaded to the access switch.

16. The system of claim 15, wherein the controller determines the location of the host by tracking the location of the host using the host MAC address and one or more IP addresses.

17. The system of claim 16, wherein the controller tracks the location of the host by storing an IP address of the access switch and a port address of the host as host location information.

18. The system of claim 17, wherein the controller tracks the location of the host using any one of an overlay control protocol, telemetry, element management system information or OpenFlow protocol.

19. The system of claim 18, wherein the controller detects traffic flow by identifying drop flow entries on a firewall cluster associated with the host.

20. The system of claim 15, wherein the controller causes the traffic flow to be offloaded to the access switch by programming the traffic flow on the access switch.

\*    \*    \*    \*    \*